Aug. 8, 1933.  W. E. HIGGINS  1,921,821
INSECT REPELLER
Filed May 6, 1932
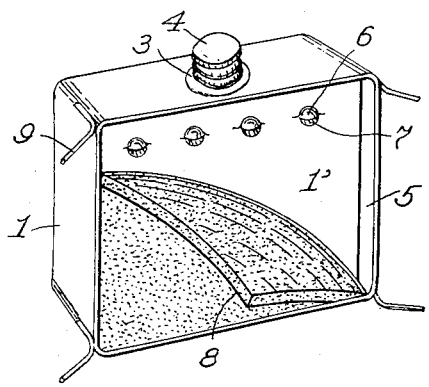
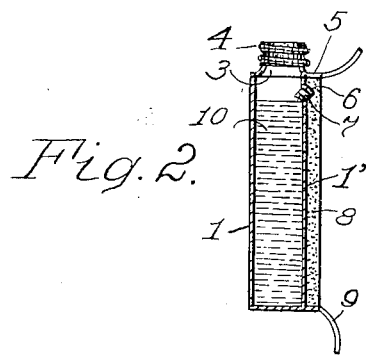
INVENTOR
Walter E. Higgins,
BY G. C. Kennedy.
ATTORNEY Patented Aug. 8, 1933

1,921,821

UNITED STATES PATENT OFFICE 1,921,821

INSECT REPELLER

Walter E. Higgins, Waterloo, Iowa

Application May 6, 1932. Serial No. 609,697

3 Claims. (Cl. 299—24)

My invention relates to improvements in insect repellers, and the object of my improvement is to supply a container for a liquid repellent with means for fastening it upon a screen door or the like, the device having a porous element for receiving and delivering the repellent in vaporous form and evenly through the adjacent atmosphere, to repel such insects as flies or mosquitoes, to a distance which prevents their entry into a building.

Another object of my improvements is to so construct the device that when fastened upon a swinging or movable member such as a door or casement, or the like, the concussions or slamming of these members will create a splashing of the liquid repellent, so as to eject small amounts thereof through appropriate channels to be absorbed by a porous pad thereon and delivered therefrom as a vapor at the door.

These objects have been accomplished by the means which are hereinafter described and claimed, and which are illustrated in the accompanying drawings, in which Fig. 1 is an isometric perspective view or projection of my improved device, showing a portion of the absorbing and delivering pad detached and bent away from the delivering apertures or ports of the container. Fig. 2 is a cross section taken vertically through the device and a little to one side of its middle line, the removable screw-cap being shown in side elevation.

The hollow container 1 may be of any desired or appropriate shape, size or material than that depicted, the one illustrated being preferably a metal box or can of rectangular and flattened shape, having a nipple 3 medial in its top, preferably threaded to receive a screw-cap 4. One face 1' of this can is inset at 5 to provide a recessed seat to receive a pad 8 of felt or other porous substance flush with the outer edges of the recess wall.

Along the upper part of this inset wall 1' may be made one or more delivery ports 7, horizontally alined. Each port is channeled obliquely outwardly and downwardly, with a hood 6 thereover.

Short flexible wires 9 are soldered to the corners of the can 1, or other devices used instead, to secure the can upon the upper portion of the screen netting of a door or the like.

A quantity of a suitable liquid repellant 10, obnoxious to flies, mosquitoes or other insects, is placed in the cam 1, preferably at a level slightly below the inner openings of the hooded ports 7. At each time that the screen door is opened, released and comes back to its closed position in jarring against the door-frame, the liquid 10 in the can 1 is agitatedly splashed upwardly therein, so that portions of the liquid escape outwardly through the inclined channels 7, and are absorbed by the felt pad 8, the liquid soon becoming distributed evenly therethrough by both gravitation and capillary attraction. The whole surface of the pad thus being damp, produces a vapor throughout its area to permeate the air around the upper part of the door to which such insects naturally find their way in moving up the door, and the insects are thus repelled and prevented from passing through the doorway when the door is opened.

It should be noted that as the channels 7 are inclined, each port has at the top an arcuate hood 6, and below the hood is spaced therefrom by said channel with an inwardly directed part inclined upwardly. This latter serves to catch a portion of the splashed liquid to carry it outwardly, while the hood 6 prevents the issuing liquid from moving upwardly, but on the other hand, directs the liquid as it is issuing, downwardly upon the pad 8 and to descend evenly therethrough. The pad 8 is thus kept wet throughout and as much so in its lower as in its upper portion. The relative violence of the jarring of the device in practice is such, that even when the liquid is at a low ebb in the container 1, it will be splashed upwardly to issue through said ports 7.

Having described my invention, what I claim as new, and desire to secure by Letters Patent, is:

1. In a device of the character described, a closed container having outwardly and downwardly inclined apertures arranged horizontally along one face and having said face surrounded by a flange, and a porous pad fitted in said flange to receive a liquid repellent through said apertures when the container is jarred to splash the contents.

2. A device of the character described, comprising a closed container having a flanged side face, a porous pad fitted within the flanges, said container having in said face ports inclined outwardly and downwardly to deliver to said pad, and said ports being ranged along the upper portion of said side face.

3. A device of the character described, comprising a closed container having a receiving port in its top and a closure therefor, and having ports along the upper part of one side face, a porous pad secured upon said side face to receive a liquid repellent splashed from the contents of the container therethrough, said ports being directed from within inclinedly downwardly outwardly to deliver the repellent upon and to permeate the pad downwardly, each port having an outwardly directed hood at the top sloping downwardly, and each port also having an inwardly directed chute projection inclined upwardly to receive and conduct outwardly and downwardly splashed liquid to the pad, each hood serving as a baffle against upward projection of the liquid while directing it downwardly upon the pad.

WALTER E. HIGGINS.